(12) United States Patent
Holst-Pedersen

(10) Patent No.: US 11,819,018 B2
(45) Date of Patent: Nov. 21, 2023

(54) RODENT TRAP

(71) Applicant: ALERT HOUSE APS, Valby (DK)

(72) Inventor: Ulrik Holst-Pedersen, Birkeroed (DK)

( * ) Notice: Subject to any disclaimer, the term of this patent is extended or adjusted under 35 U.S.C. 154(b) by 0 days.

(21) Appl. No.: 17/641,409

(22) PCT Filed: Oct. 9, 2020

(86) PCT No.: PCT/EP2020/078505
§ 371 (c)(1),
(2) Date: Mar. 8, 2022

(87) PCT Pub. No.: WO2021/069720
PCT Pub. Date: Apr. 15, 2021

(65) Prior Publication Data
US 2022/0295778 A1    Sep. 22, 2022

(30) Foreign Application Priority Data
Oct. 11, 2019   (SE) ..................... 1930326-2

(51) Int. Cl.
*A01M 23/30*   (2006.01)
*A01M 23/24*   (2006.01)
*G01D 5/14*    (2006.01)

(52) U.S. Cl.
CPC .......... *A01M 23/30* (2013.01); *A01M 23/245* (2013.01); *G01D 5/142* (2013.01)

(58) Field of Classification Search
CPC ........................... A01M 23/30; A01M 23/245
USPC ................................ 43/81, 81.5, 82, 83, 83.5
See application file for complete search history.

(56) References Cited

U.S. PATENT DOCUMENTS

| | | | | |
|---|---|---|---|---|
| 1,462,739 A * | 7/1923 | Champlin | ............. | A01M 23/30 43/83 |
| 2,616,211 A * | 11/1952 | Johnson | ................ | A01M 23/30 43/81 |
| 4,711,049 A * | 12/1987 | Kness | ................... | A01M 23/30 43/81 |
| 6,574,912 B1 * | 6/2003 | Johnson | ................ | A01M 23/26 43/88 |
| 7,954,275 B2 * | 6/2011 | Frisch | ................. | A01M 23/005 43/81 |
| 10,477,854 B1 * | 11/2019 | Yang | ...................... | A01M 23/30 |
| 10,765,106 B2 * | 9/2020 | Crezee | ................ | A01M 31/002 |
| 11,033,018 B2 * | 6/2021 | Laut | ....................... | H01H 1/242 |

(Continued)

FOREIGN PATENT DOCUMENTS

| | | | | |
|---|---|---|---|---|
| CN | 114745953 A * | 7/2022 | ............ | A01M 23/12 |
| DE | 29802012 U1 * | 6/1998 | ............ | A01M 23/24 |

(Continued)

*Primary Examiner* — Darren W Ark
(74) *Attorney, Agent, or Firm* — Patent Grove AB; Tomas Friend

(57) ABSTRACT

A rodent trap is disclosed comprising a base and a kill bar, wherein the kill bar is pivotably connected to the base, a trigger member pivotably connected to the base and arranged between the base and the kill bar such that when the trigger member is activated the kill bar is released and traps or kills a rodent, the rodent trap further comprises a sensor configured to detect at least three different distances between the trigger member and the base. A rodent trap system is disclosed and a related method for determining a ready state, a sprung empty state and a caught state of a rodent trap.

16 Claims, 11 Drawing Sheets

(56) References Cited

U.S. PATENT DOCUMENTS

| | | | |
|---|---|---|---|
| 11,337,416 B1* | 5/2022 | Walsh | A01M 23/38 |
| 2009/0151221 A1* | 6/2009 | Daley | A01M 23/245 |
| | | | 43/58 |
| 2018/0199565 A1* | 7/2018 | Zosimadis | A01M 1/026 |
| 2018/0249698 A1* | 9/2018 | Jensen | G08B 21/18 |
| 2018/0317476 A1* | 11/2018 | Jones | A01M 23/245 |
| 2019/0037829 A1* | 2/2019 | Laut | H01H 1/242 |
| 2020/0029550 A1* | 1/2020 | Koziar, Jr. | A01M 23/30 |
| 2021/0022333 A1* | 1/2021 | Vickery | A01M 25/004 |
| 2022/0346366 A1* | 11/2022 | Bjerre | A01M 23/30 |

FOREIGN PATENT DOCUMENTS

| | | | | |
|---|---|---|---|---|
| EP | 1350430 A1 * | 10/2003 | | A01M 23/04 |
| EP | 3351099 A1 * | 7/2018 | | |
| GB | 2578734 A * | 5/2020 | | A01M 23/00 |
| JP | 6710203 B2 * | 6/2020 | | A01M 1/026 |
| WO | WO-2015052694 A1 * | 4/2015 | | A01M 23/24 |
| WO | WO-2017036480 A1 * | 3/2017 | | A01M 23/24 |
| WO | WO-2017149163 A1 * | 9/2017 | | |
| WO | WO-2018174715 A1 * | 9/2018 | | A01M 23/00 |
| WO | WO-2019040648 A1 * | 2/2019 | | A01M 23/30 |
| WO | WO-2020023570 A1 * | 1/2020 | | A01M 23/245 |
| WO | WO-2020095032 A1 * | 5/2020 | | A01M 23/00 |
| WO | WO-2022180052 A1 * | 9/2022 | | |

* cited by examiner

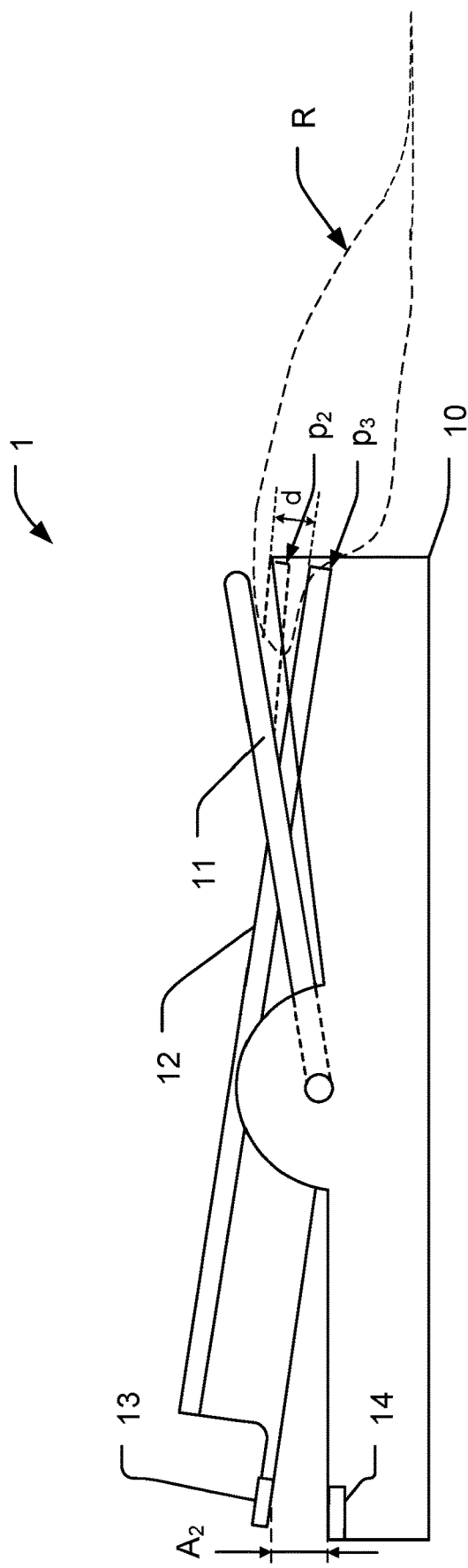

RODENT TRAP

TECHNICAL FIELD

The present invention relates to a rodent trap. More specifically the present invention relates to a rodent trap of a snap type comprising a sensor to detect states of the trap.

BACKGROUND

There are different types of traps available today, such as mazes or cages to use when trying to get rid of rodents. Another type of rodent trap is a snap trap. The snap trap is designed to trap and kill a rodent between a spring loaded bar, here referred to as a kill bar, and a base of the trap.

Commonly these traps are made for mice or rats. The main difference between a trap made for rats and a trap made for mice is that rat traps are larger and made such that the bar hits the rat with a greater force than the mouse in the mouse trap.

A problem with these traps is that they might fail in trapping or killing a rodent which has triggered the trap. A rodent may be fast enough to escape the trap before being trapped by the kill bar. A rodent may also be so large that even if it is hit by the kill bar it is not killed or not even trapped by the rodent trap.

Thus, improvements to rodent traps which allows for confirming the trapping or killing of the rodent, if the trap has sprung empty or if the trap is armed is desirable.

SUMMARY

It is, therefore, an object of the present invention to overcome or alleviate the above described problems.

One objective is to provide a rodent trap which is robust and reliable in determining an armed ready state, a sprung empty state and if a rodent has been caught in a caught state thereof.

One or more of these objectives, and other objectives that may appear from the description below, are at least partly achieved by means of a rodent trap according to the independent claims, embodiments thereof being defined by the dependent claims.

According to a first aspect, a rodent trap is provided comprising a base, a kill bar, wherein the kill bar is pivotably connected to the base, a trigger member, wherein the trigger member is pivotably connected to the base and arranged between the base and the kill bar such that when the trigger member is activated the kill bar is released and traps or kills a rodent, the rodent trap comprises a sensor configured to detect at least three different distances ($A_1$, $A_2$, $A_3$) between the trigger member and the base.

According to a second aspect, a method is provided for determining a ready state, a sprung empty state and a caught state of a rodent trap comprising a base, a kill bar and a trigger member arranged between the base and the kill bar such that when the trigger member is activated the kill bar is released and traps or kills the rodent, the method comprising detecting at least three different distances ($A_1$, $A_2$, $A_3$) between the trigger member and the base.

According to a third aspect, a rodent trap system is provided comprising a plurality of rodent traps, the rodent trap comprising a base, and a kill bar, wherein the kill bar is pivotably connected to the base, a trigger member, wherein the trigger member is pivotably connected to the base and arranged between the base and the kill bar such that when the trigger member is activated the kill bar is released and traps a rodent, a sensor configured to detect at least three different distances ($A_1$, $A_2$, $A_3$) between the trigger member and the base, a wireless transmitter in communication with the sensor and being configured to transmit any of the at least three different distances to at least one receiver, and/or transmit any of a ready state, a sprung empty state and a caught state of the rodent trap associated with the at least three different distances to at least one receiver, the rodent trap system comprising said at least one receiver.

Further examples of the disclosure are defined in the dependent claims, wherein features for the first aspect may be implemented for the second and subsequent aspects, and vice versa.

Having a sensor configured to detect at least three different distances between the trigger member and the base provides for a robust and reliable detection of different states of the rodent trap, since the position of the trigger member can be accurately determined, where said position is indicative of whether a rodent has been caught or not after the trap has been triggered.

Some examples of the disclosure provide for a more robust and reliable detection of a ready state, a sprung empty state and a caught state of a rodent trap.

Some examples of the disclosure provide for a facilitated and more efficient managing of a plurality of rodent traps in a rodent trap system.

Still other objectives, features, aspects and advantages of the present disclosure will appear from the following detailed description, from the attached claims as well as from the drawings.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which examples of the invention are capable of will be apparent and elucidated from the following description of examples of the present invention, reference being made to the accompanying drawings, in which;

FIGS. 3A-G are schematic illustrations, in side views of a rodent trap having three different distances between a base and a trigger member thereof, for different states of the rodent trap, according to examples of the disclosure;

DETAILED DESCRIPTION

Embodiments of the invention will now be described more fully hereinafter with reference to the accompanying drawings, in which some, but not all, embodiments of the invention are shown. The invention may be embodied in many different forms and should not be construed as limited to the embodiments set forth herein.

Figure 1:
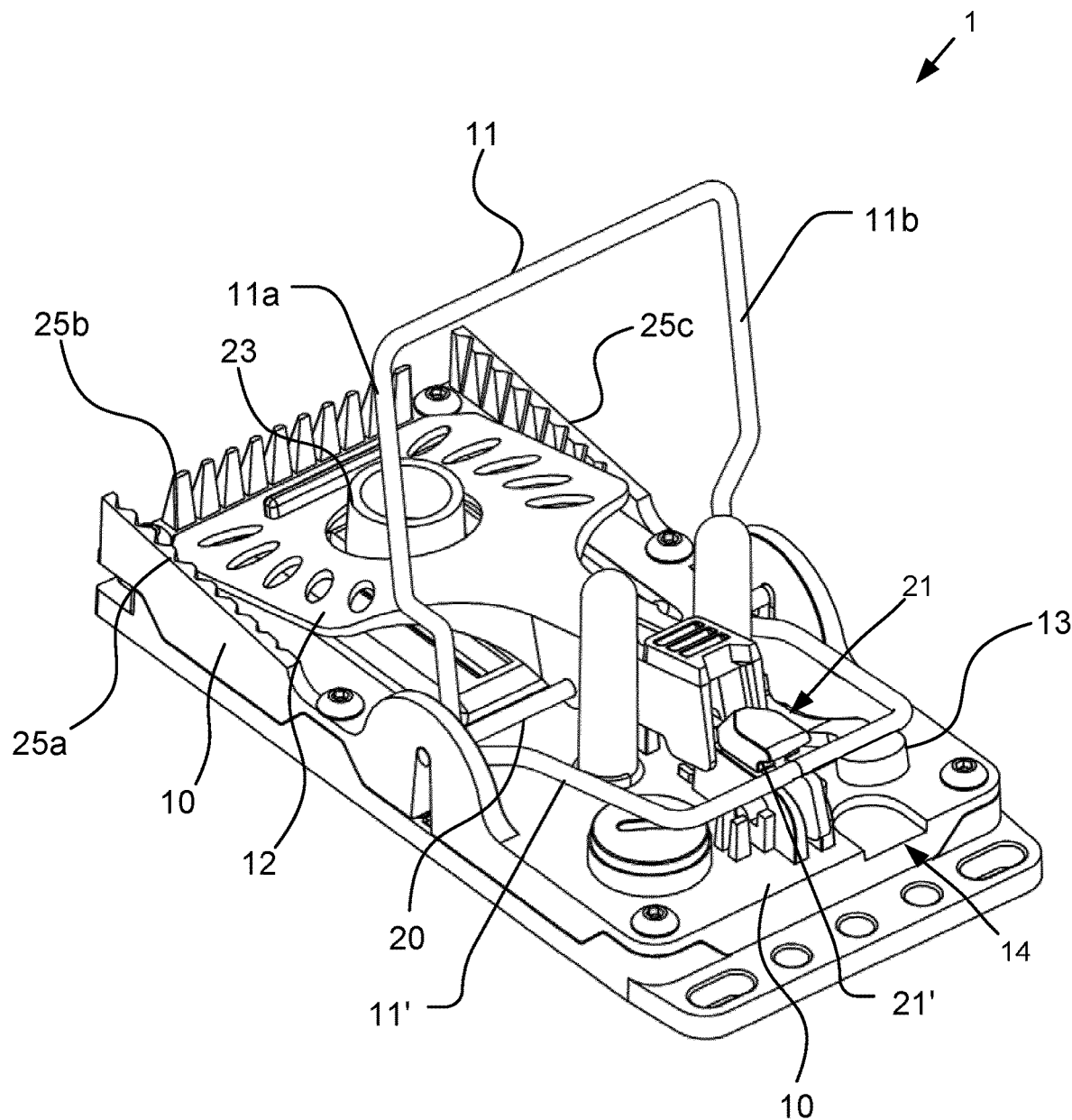
FIG. 1 is a schematic illustration, in a perspective view of a rodent trap comprising a sensor, according to one example.

FIG. 1 is a schematic perspective view of an example of a rodent trap 1 comprising a base 10 and a kill bar 11. The kill bar 11 is pivotably connected to the base 10 by a connection bar 20 extending across the base 10 essentially in parallel with the kill bar 11. The kill bar 11 is also connected to a spring (not shown), for spring loading of the kill bar. FIG. 1 shows an armed ready state of the rodent trap 1 where the rodent trap 1 has been set by forcing the kill bar 11 against the spring and locked in place by a locking mechanism 21. The example in FIG. 1 shows the locking mechanism 21 engaging with an angled extension bar 11' of the kill bar 11, where the angled extension bar 11' locks into a notch 21' of the locking mechanism 21. It should be understood however that the kill bar 11 may be locked into place in an armed ready state of the rodent trap 1 by various locking mechanisms.

The rodent trap 1 comprises a trigger member 12. The kill bar 11 is releasable from the locking mechanism 21 by the trigger member 12. The trigger member 12 is engaged with the locking mechanism 21 so that pivoting of the trigger member 12 unlocks the locking mechanism 21 from an armed position when holding the kill bar 11 in the ready state. Thus, the trigger member 12 is pivotably connected to the base 10 and arranged between the base 10 and the kill bar 11 such that when the trigger member 12 is activated by the rodent, the locking mechanism 21 is released which thereby releases the kill bar 11 which in turn traps or kills the rodent. The kill bar 11 may e.g. be released by releasing the angled extension bar 11' from notch 21'. Thus, the effect of the rodent triggering the trigger member 12 is that the kill bar 11 quickly and forcibly moves towards the base 10 and thus hits and traps the rodent against the base 10. Ideally, the kill bar 11 will hit the rodent with a force which is enough to produce an impulse which kills the rodent instantaneously.

A bait is usually placed on or in a bait holder 23 which may be arranged on or near the trigger member 12 in order to attract a rodent towards the trigger member 12. When a rodent comes into contact with the trigger member 12 it should pivot the trigger member 12 which unlocks the locking mechanism 21 and thus releases the kill bar 11 as explained above.

The rodent trap 1 comprises a sensor 13, 14, which is configured to detect at least three different distances ($A_1$, $A_2$, $A_3$) between the trigger member 12 and the base 10. FIGS. 3A-G show examples of such detected distances ($A_1$, $A_2$, $A_3$) between the trigger member 12 and the base 10. The sensor 13, 14, is thus arranged to sense the position of the trigger member 12 relative to the base 10 as the trigger member 12 pivots with respect to the base 10 during the operational states of the rodent trap 1, as exemplified in FIGS. 3A-G. FIG. 1 and FIGS. 3A-G show examples where the sensor 13, 14, is arranged at an end of the rodent trap 1, essentially opposite the end where the rodent is trapped by the kill bar 11. It should be understood however that the sensor 13, 14, may be arranged at other positions, along the extension of the base 10 and trigger member 12 to detect at least three different distances ($A_1$, $A_2$, $A_3$) between the trigger member 12 and the base 10 while providing for the advantageous benefits as further described below. Increasing the distance between the sensor 13, 14, and a pivot point of the trigger member 12, which may be the arranged at or adjacent the connection bar 20 in some examples, provides for increasing the length of the range of motion of the trigger member 12 relative to the base 10. This may provide for a facilitated distinguishing and detecting of the at least three different distances ($A_1$, $A_2$, $A_3$), and thus for a more accurate detection of the states of the rodent trap 1.

The sensor 13, 14, may comprise a sensor suitable to detect the distance ($A_1$, $A_2$, $A_3$) between the trigger member 12 and the base 10, e.g. one or more of an electrical sensor, mechanical sensor, electro-mechanical sensor, optical sensor, or a magnetic sensor. The sensor 13, 14, may comprise one or more sensor components 13, 14, arranged on the base 10 and/or on the trigger member 12. FIG. 1 and FIGS. 3A-G show examples where the sensor 13, 14, comprises two sensor components 13, 14, arranged on the trigger member 12 and the base 10, respectively. In one example, a first sensor component 13, arranged on the trigger member 12, may be arranged essentially opposite a second sensor component 14 arranged on the base 10. The first and second sensor components 13, 14, may be in communication to detect a variation in the separation between the first and second sensor components 13, 14, as the trigger member 12 pivots relative to the base 10. At least three different distances ($A_1$, $A_2$, $A_3$) between the trigger member 12 and the base 10 may thus be determined as the amount of said separation varies. In some examples the first or second sensor component 13, 14, is a passive component which do not need a power supply, such as a magnet. In some examples the first or second sensor component 13, 14, is a part of the structure forming the trigger member 12 or the base 10 which is chosen as a passive detection point for e.g. a proximity sensor, such as an optical sensor, configured to detect the at least three different distances ($A_1$, $A_2$, $A_3$) between the trigger member 12 and the base 10. The passive detection point be in such case be a flat surface in the material from which the trigger member 12 or base 10 is formed. The first sensor component 13 and the second sensor component 14 may comprise such passive detection point and proximity sensor, respectively, in one example.

In one example, the sensor 13, 14, comprises a magnetic sensor 13, 14. The magnetic sensor 13, 14, may comprise a magnet 13 as a first sensor component 13 and a magnetic sensor unit 14 as a second sensor component 14, as described further below.

Having a sensor 13, 14, detecting at least three different distances ($A_1$, $A_2$, $A_3$) between the trigger member 12 and the base 10 provides for a robust and reliable detection of different states of the rodent trap, since the position of the trigger member 12 can be accurately determined, where said position is indicative of whether a rodent has been caught or not after the trap has been triggered. Having the sensor 13, 14, detecting the position of the trigger member 12 alleviates the need for having detection capability directly on the position of the kill bar 11 in sensor-based rodent traps. This allows for optimizing the function of the kill bar 11 separately, e.g. with respect to speed, force, or re-useability, without having concern of providing detection functionality. A more efficient rodent trap 1 is thus provided with a more reliable detection of the different states of the rodent trap.

Figure 3A:
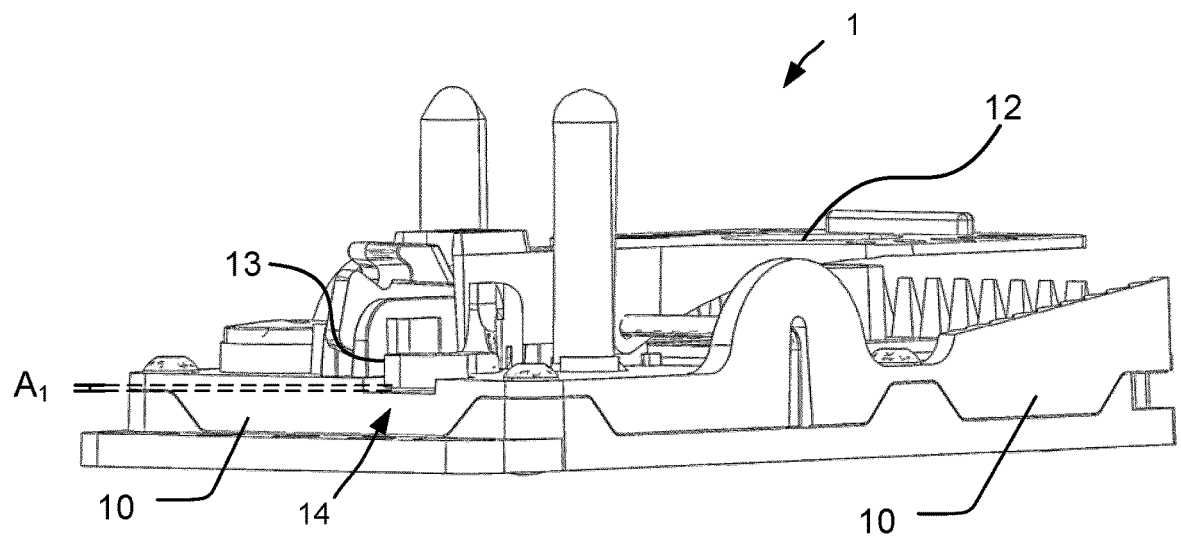
Figure 3B:
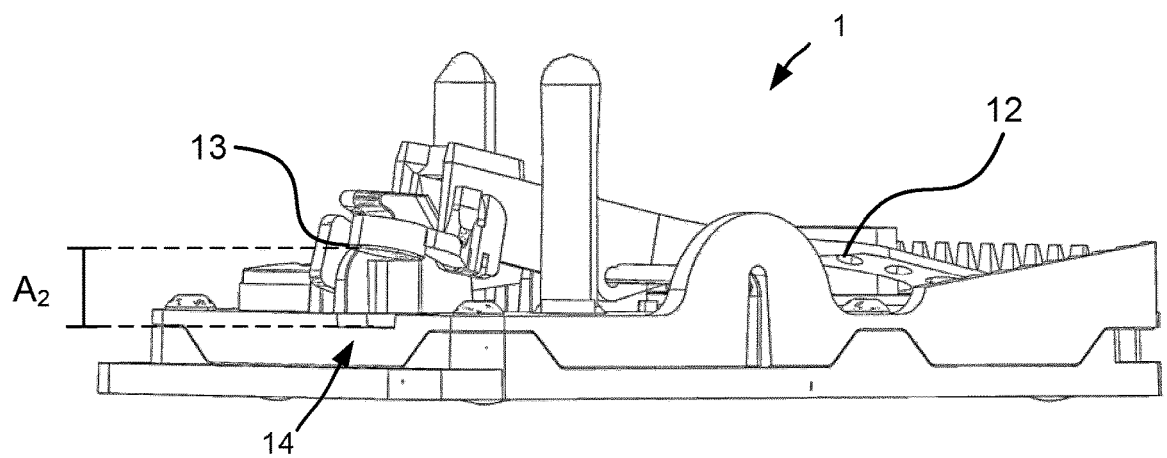
Figure 3C:
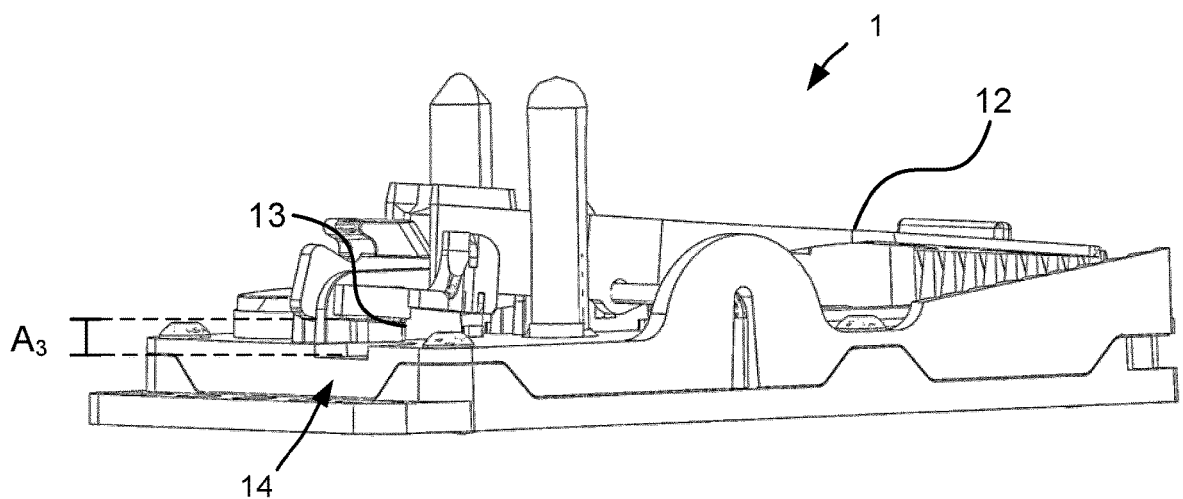
Figure 3D:
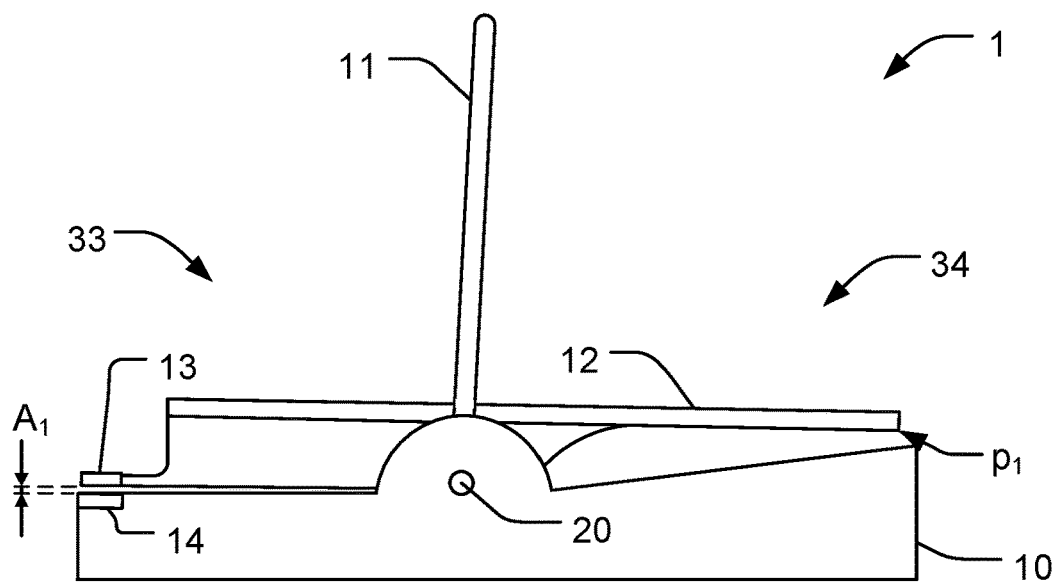

Detection of at least three different distances ($A_1, A_2, A_3$) between the trigger member 12 and the base 10 is exemplified in FIGS. 3D-G. FIG. 3D shows an armed ready state of the rodent trap 1, i.e. the kill bar 11 has been forced to its armed position and locked by the locking mechanism 21 (FIG. 1), where the sensor 13, 14, is arranged to detect a distance denoted $A_1$ between the trigger member 12 and the base 10. The trigger member 12 assumes a first position ($p_1$) in this state, as further denoted in FIG. 3D. FIG. 3A shows an alternative side-view of this state of the rodent trap 1.

Figure 3E:
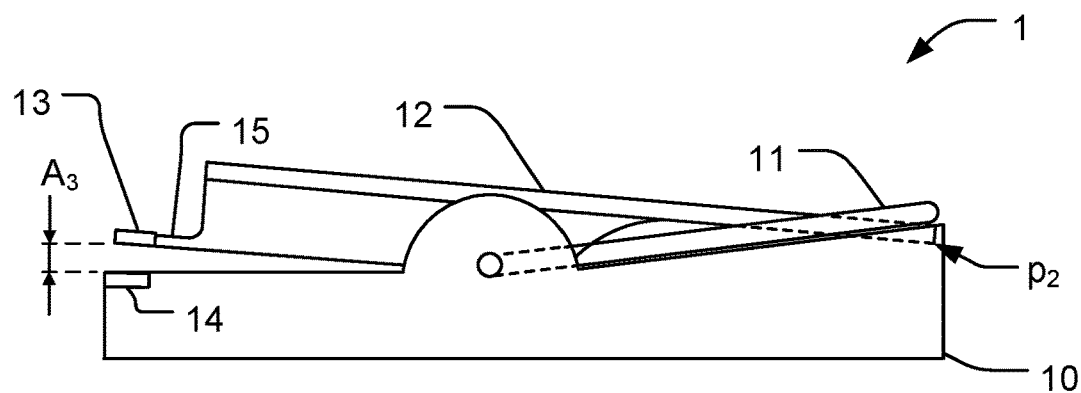

FIG. 3E shows a state of the rodent trap 1 where the kill bar 11 is in an unloaded position and in abutment with the base 10. This state corresponds to a sprung empty state of the rodent trap 1, i.e. the trigger member 12 has been triggered, moving the kill bar 11 forcibly down towards the base 10, but no rodent is trapped by the kill bar 11. The kill bar 11 cause movement of the trigger member 12 from the first position ($p_1$) to a second position ($p_2$) when the kill bar 11 moves from the armed position (FIG. 3D) to the unloaded position in FIG. 3E. The sensor 13, 14, is arranged to detect a distance denoted $A_3$ between the trigger member 12 and the base 10, which accordingly is different from the distance denoted $A_1$ in FIG. 3D. FIG. 3C shows an alternative side-view of this state of the rodent trap 1.

Figure 3F:
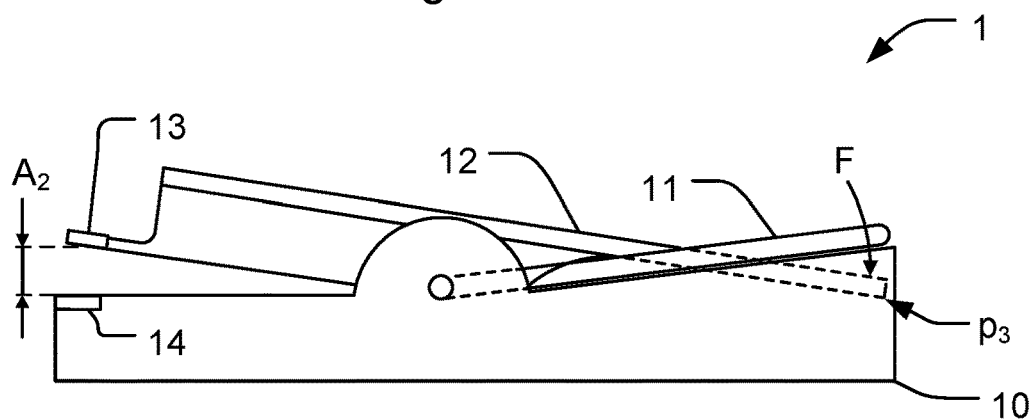

The trigger member 12 is movable relative the kill bar 11 in a direction towards the base 10 from the second position ($p_2$) to a third position ($p_3$) while the kill bar 11 is in said unloaded position, as schematically illustrated in FIG. 3F. Thus, a gap (d) can be arranged in between the second ($p_2$) and third positions ($p_3$) of the trigger member 12 which accommodates at least part of the rodent (R) when trapped in the rodent trap 1, as further schematically illustrated in FIG. 3G. The position of the trigger member 12 in the second position ($p_2$) is schematically illustrated in FIG. 3G with dashed lines for comparison. This is referred to as the caught state of the rodent trap 1. The sensor 13, 14, is arranged to detect a distance denoted $A_2$ between the trigger member 12 and the base 10, which is different from the distance denoted $A_3$ in FIG. 3E since the trigger member 12 has moved to the third position ($p_3$), e.g. by a rodent (R) pushing down on the trigger member 12 as exemplified in FIG. 3G. FIG. 3B shows an alternative side-view of this state of the rodent trap 1. It should be understood that while the trigger member 12 is movable relative the kill bar 11 from the second position ($p_2$) to the third position ($p_3$) while the kill bar 11 is in said unloaded position, as described with reference to FIG. 3F, the trapping of a rodent (R) under the kill bar 11, as shown in FIG. 3G, can alter the position of the kill bar 11 depending on how large part of the rodent is trapped. Regardless, having a trigger member 12 which is movable from the second position ($p_2$) to the third position ($p_3$) as described above provides for the detection of the third distance $A_3$ when a rodent has been trapped, independent on the current position of the kill bar 11 (in FIG. 3G).

The trigger member 12 may be resiliently movable from the second position ($p_2$) to the third position ($p_3$) upon application of a force (F) on the trigger member 12 towards the base 10, as illustrated in FIG. 3F. Thus, the trigger member 12 may be biased to move from the third position ($p_3$) to the second position ($p_2$) when the force (F) is removed. The provides for having the trigger member 12 returning to the second position ($p_2$) if a rodent first depresses the trigger member 12 to the third position ($p_3$) but later manages to escape from underneath the kill bar 11. The sensor 13, 14, then detects the second distance $A_2$ (different from $A_1$ and $A_3$) which is indicative of the sprung empty state of the rodent trap 1, and may additionally provide the information that a rodent was first trapped but then escaped.

The sensor 13, 14, may thus be configured to relate a first trigger distance ($A_1$) of the at least three different distances ($A_1, A_2, A_3$) to the first position ($p_1$) and the ready state of the rodent trap 1. The sensor 13, 14, may be configured to relate a second trigger distance ($A_2$) of the at least three different distances ($A_1, A_2, A_3$) to said third position ($p_3$) and the caught state of the rodent trap 1. Further, the sensor 13, 14, may be configured to relate a third trigger distance ($A_3$) of the at least three different distances ($A_1, A_2, A_3$) to the second position ($p_2$) and the sprung empty state of the rodent trap 1.

Figure 2:
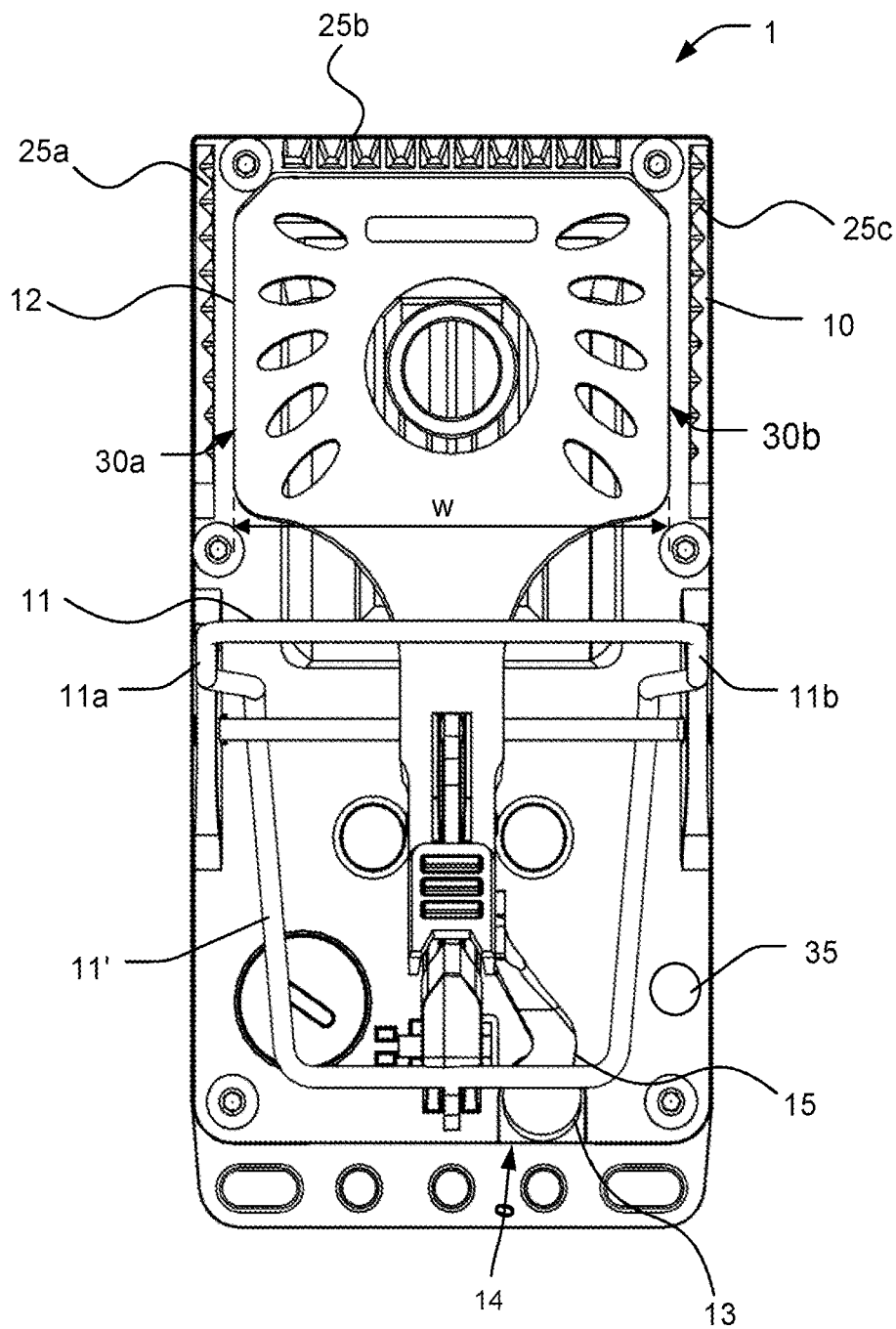
FIG. 2 is a schematic illustration, in a top view of a rodent trap, according to one example.

FIG. 2 is a top view of an example of the rodent trap 1. From this view it can be seen that the kill bar 11 may be formed in such a way that the kill bar 11 extends outside of the trigger member 12 on a left side 30a and right side 30b of the trigger member 12. I.e. the inner separation between arms 11a, 11b, which connect to the horizontal kill bar 11 is wider than the width (w) of the trigger member 12. The kill bar 11, or the arms 11a, 11b, thereof may thus strike against edges 25a, 25c, of the base 10 on a left and right side of the trigger member 12, without having the arms 11a, 11b, interfering with the trigger member 12. Edges 25a, 25c, may in some examples comprise teeth and/or grooves, also denoted 25a and 25c in FIG. 2. Thus, the kill bar arms 11a, 11b, may extend to, and conform with, the arrangement of the aforementioned edges 25a, 25c, in the examples of FIGS. 1-3 when activated and forced down by a kill bar spring (not shown). The edges 25a, 25c, will therefore limit the downward movement of the kill bar 11 toward the base 10. Further, when the kill bar 11, and/or arms 11a, 11b, thereof rest on edges 25a, 25c, a top of the kill bar 11 (denoted with reference numeral 11 in FIG. 1), extending in parallel with a top edge 25b of the base 10, and in some examples interior to the top edge 25b, will push down on the trigger member 12, as illustrated and described above with reference to FIG. 3E and the second position ($p_2$) of the trigger member 12. The trigger member 12 may be biased to move towards the first position ($p_1$) in some examples. This provides for facilitating the arming of the rodent trap 1 in the ready position (FIG. 3D). In case the trigger member 12 has such bias, the kill bar 11 keeps the trigger member 12 from moving towards the first position ($p_1$) when pushing down on the trigger member 12 (FIG. 3E).

The bias of the trigger member 12 may be provided by a trigger spring (not shown), which urges the trigger member 12 upward back to the first position ($p_1$). In an example, the trigger member 12 may not be connected to the trigger spring but instead the trigger member 12 strives towards the first position ($p_1$) due to the trigger member 12 having a larger mass on a locking mechanism side 33 of the connection rod 20 than towards a side 34 of the trigger member 12 where the rodent triggers the trigger member 12 (see references in FIG. 3D). Thus, the locking mechanism side 33 of the trigger member 12 may act as a counterweight to the opposite side 34 of the trigger member 12. So, the locking mechanism side 33 is heavier, and this will make the trigger member 12 return to the first position ($p_1$) (FIG. 3D) unless the kill bar 11 is pushing the trigger member 12 down (FIG. 3E).

A top of the kill bar 11 may in some examples extend above the trigger member 12 along edge 25b. The kill bar 11 or the trigger member 12 may in those examples comprise a linkage member that mechanically connects the kill bar 11 and the trigger member 12 so that the trigger member 12 is kept in a position corresponding to the second position ($p_2$). Regardless, the trigger member 12 is configured to move from the second position ($p_2$) to the third position ($p_3$), to accommodate a rodent, as described above with reference to FIGS. 3F-G, independent on how the pivot angle of the trigger member 12 is restricted to the second position ($p_2$) at the sprung empty state of the rodent trap 1.

In some examples the edges 25a-c of the base 10 comprises a sharp elevation from the base 10. Alternatively, or in addition, the edges 25a-c comprises teeth and/or grooves. The rodent trap 1 may only have teeth/grooves and/or sharp elevations along one edge 25a-c. Teeth/grooves and/or sharp elevations may be mixed or combined along different edges 25a-c. In one example the edges 25a-c do not comprise teeth/grooves, or sharp elevations, but only blunt edges.

The sensor 13, 14, may comprise a magnetic sensor 13, 14, as mentioned above. In one example, the trigger member 12 comprises a magnet 13 and the base 10 comprises a magnetic sensor unit 14. The magnetic sensor unit 14 is configured to detect the magnetic field from the magnet 13. The magnetic field varies depending on the amount of separation between the magnet 13 and the magnetic sensor unit 14. The magnet 13 and the magnetic sensor unit 14 may be arranged essentially opposite each other on the trigger member 12 and the base 10, respectively. The magnetic sensor 13, 14, may thus relate the variation in magnetic field to the aforementioned at least three different distances ($A_1$, $A_2$, $A_3$) between the trigger member 12 and the base 10. In an example, the magnetic sensor 13, 14, comprises a Hall effect sensor or a reed switch which is configured to detect and convert a magnetic field into a current and/or voltage difference which can be related to the different distances ($A_1$, $A_2$, $A_3$). Other types of magnetic sensors 13, 14, may also be used to detect the magnetic field and relate the magnetic field to the distances ($A_1$, $A_2$, $A_3$). It is conceivable that in one example the magnet 13 is arranged on the base 10 and the magnetic sensor unit 14 is arranged on the trigger member 12.

In an example where the magnetic sensor 13, 14, comprises a reed switch, the number of reed switches used in the rodent trap 1 may be chosen to correspond to at least the number of distances ($A_1$, $A_2$, $A_3$) that should be sensed minus one. I.e. if three distances ($A_1$, $A_2$, $A_3$) need to be distinguished, 3−1=2 reed switches suffices to detect the three distances ($A_1$, $A_2$, $A_3$). This is due to the reed switch being an on-off switch.

Having a magnetic sensor 13, 14, as described allows for accurately determine if the rodent trap 1 is in the ready state to catch a rodent, if the trap is in a sprung empty state, i.e. in false-positive state, or in the caught state when the rodent has been caught. At the same time, a magnetic sensor 13, 14, provides for reduced complexity and a robust rodent trap 1 with minimal maintenance.

The sensor 13, 14, may however comprise any sensor suitable to detect the distance ($A_1$, $A_2$, $A_3$) between the trigger member 12 and the base 10, e.g. one or more of an electrical sensor, mechanical sensor, electro-mechanical sensor, or an optical sensor.

In an example and to further increase a distance between the three different trigger distances ($A_1$, $A_2$, $A_3$), the trigger member 12 comprises an extension 15. The extension 15 may comprise the magnet 13, as schematically illustrated in e.g. FIG. 2 and FIG. 3E. By having the extension 15, the distance between the three different trigger distances ($A_1$, $A_2$, $A_3$) is increased and thus also aids in facilitating distinguishing and detecting the three different distances ($A_1$, $A_2$, $A_3$) by the magnetic sensor 13, 14.

The detection of the different distances ($A_1$, $A_2$, $A_3$) is further exemplified with reference to FIGS. 3A-C. The sensor 13, 14, comprises a magnetic sensor 13, 14, in the described example. FIG. 3A is a side view of an example of the rodent trap 1 when there is a relatively small distance $A_1$ between the magnet 13 and the magnetic sensor unit 14, i.e. the trap is in the ready state. In this ready state, the trigger member 12 and the magnet 13 may be arranged in a parallel or almost parallel position relative to the base 10. In the ready state the magnet 13 is arranged in close proximity to the magnetic sensor unit 14 and the first distance $A_1$ is thus very small, or the magnet 13 can even abut the base 10. The magnetic sensor unit 14 is configured to relate this first distance $A_1$ to the ready state of the rodent trap 1. The ready state means that the kill bar 11 is locked in place by the locking mechanism 21 and thus can be activated when the rodent activates the trigger member 12.

Illustrated in FIG. 3B is a side view of an example of the rodent trap 1 when there is a relatively large distance $A_2$ between the magnet 13 and the magnetic sensor unit 14. The rodent trap 1 is here in the caught state, corresponding to the description with respect to FIGS. 3F-G above. The trigger member 12 and the magnet 13 may here be arranged in a maximum or close to maximum tilted position relative to the base 10. The magnet 13 may thus be arranged at the largest distance $A_2$ away from the magnetic sensor unit 14. The magnetic sensor unit 14 is configured to relate this second distance $A_2$ to the caught state of the rodent trap 1. Hence, the rodent trap 1 has caught the rodent in the rodent trap 1.

In the illustrated examples, the trigger member 12 may pivot around the connection bar 20. In other examples, the trigger member 12 may pivot around other parts of the rodent trap 1. Thus, at the end of the rodent trap 1 with edges 25a-25c, an end of the trigger member 12 may be fully depressed to abut the base 10, when in the maximum or close to maximum tilted state. At the opposite end of the trigger member 12, the magnet 13 together with the base 10, and/or locking mechanism 21 may stop the trigger member 12 from tilting in an opposite direction, so that the trigger member 12 may assume a parallel position with respect to the base 10, i.e. in the ready state.

After the locking mechanism 21 has disengaged the trigger member 12, and the kill bar 11 has been released, the trigger member 12 may be kept in a somewhat tilted position by the kill bar 11, as illustrated in e.g. FIG. 3E. In order to get the trigger member 12 to fully tilt, and in some examples touch the base 10, and thus having the magnet 13 and magnetic sensor unit 14 at the largest or maximum distance $A_2$ something need to be placed in between the kill bar 11 and the trigger member 12. Thus, the largest distance $A_2$ is only realized when the rodent is actually caught and placed between the kill bar 11 and the trigger member 12, as exemplified in FIG. 3G.

Illustrated in FIG. 3C is a side view of an example of the rodent trap 1 when there is a medium distance $A_3$ between the magnet 13 and the magnetic sensor unit 14, the rodent trap 1 is in the false-positive or sprung empty state. The trigger member 12 and the magnet 13 is arranged in a slightly tilted position relative to the base 10 and the magnet 13 is arranged at the distance $A_3$, which is between the first $A_1$ and second distance $A_2$, to the magnetic sensor 14. This is the same position of the trigger member 12 as discussed above in relation to FIG. 2, i.e. when the kill bar 11 pushes on the trigger member 12. The magnetic sensor unit 14 is configured to relate this third distance $A_3$ to the false-positive or sprung empty state of the rodent trap 1. In the false-positive state the rodent or something have triggered the trigger member 12 to unlock the locking mechanism 21 and thus sending the kill bar 11 downward to the edges 25a and 25c. However, due to the configuration of the kill bar 11, edges 25a and 25c and the trigger member 12, as discussed above in relation to FIG. 2 and FIGS. 3F-G, the trigger member 12 will not be tilted in the maximum tilted position. Thus, if the trigger member 12 triggers the locking mechanism 21 to release the kill bar 11 but there is no rodent or something else placed between the kill bar 11 and the base 10, the trigger member 12 will thus be placed in the slightly tilted position, as seen in FIG. 3C, or the position $p_2$ in FIG. 3E, different from the maximum tilted position, as seen in FIG. 3B, or the position $p_3$ in FIG. 3G.

In some examples, the magnet 13 and/or magnetic sensor unit 14 is arranged on or attached to the trigger member 12, or any extension 15 of the trigger member 12. The attachment can be performed by e.g. gluing the magnet 13 to the trigger member 12.

In an example, there may be two connection rods 20 making up the connection bar 20, one on each end of the kill bar 11. In these cases, there might be two kill bars 11, each connected to respective connection rod 20. In these types of rodent traps 1, the kill bars 11 may be placed next to each other and sometimes joined together by a weld. In some examples, the kill bar 11 and the connection rods 20 are made from one continuous piece which is bent into the shape of the kill bar 11 and connection rod(s) 20.

Figure 4:
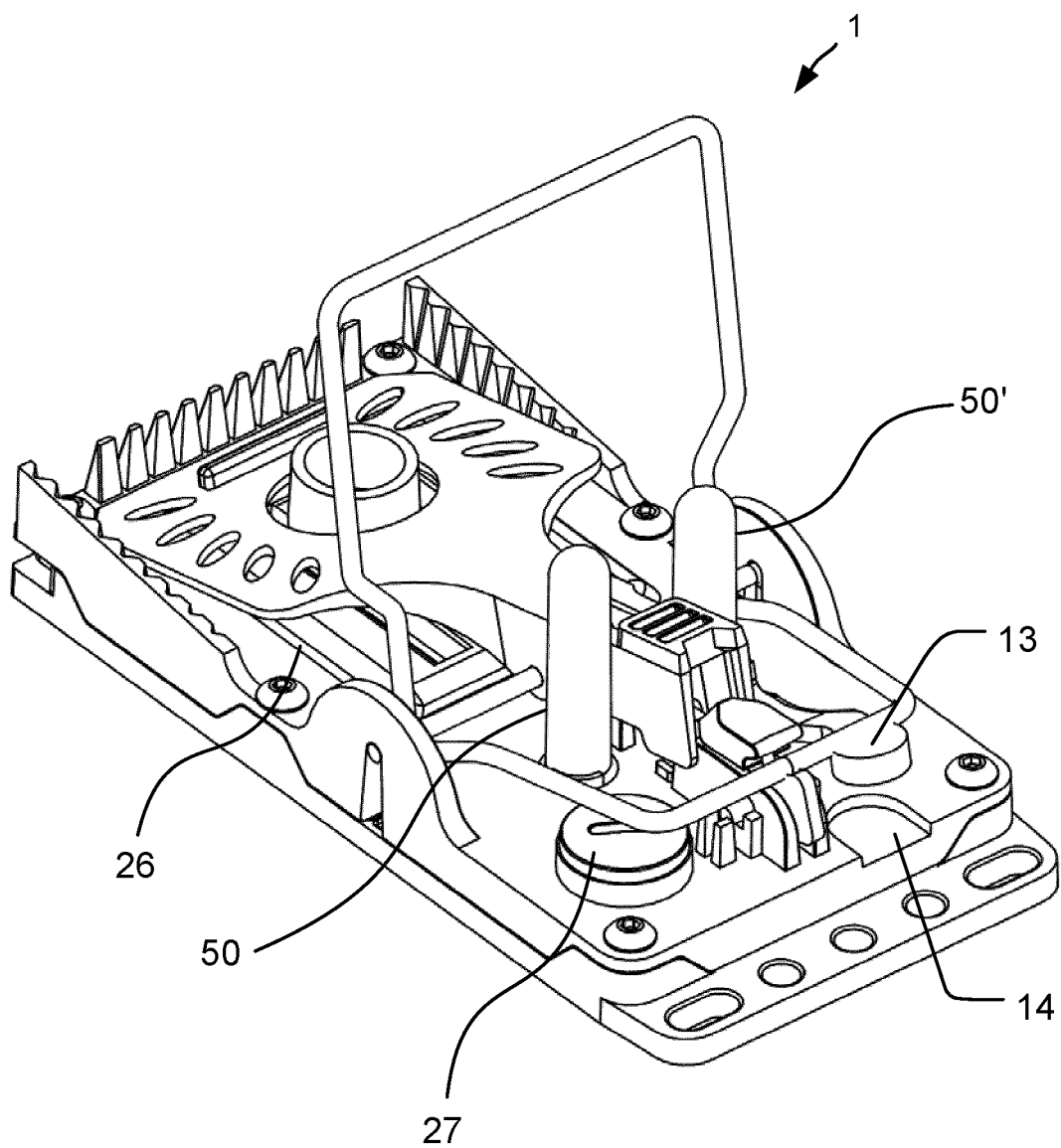
FIG. 4 is a schematic illustration, in a perspective view of a rodent trap comprising a sensor and a wireless transmitter, according to one example.

Illustrated in e.g. FIG. 4 is an example wherein the rodent trap 1 comprises a wireless transmitter 50, exemplified by an antenna denoted with reference numeral 50. In some examples the rodent trap 1 may also comprise a wireless receiver, exemplified by an antenna denoted with reference numeral 50' in FIG. 4. The wireless transmitter 50 is in communication with the sensor 13, 14. The communication may be electrical and/or wireless. The wireless transmitter and/or receiver 50, 50', may be any of a cellular unit such as GSM (Global System for Mobile Communications) unit, 3G, 4G or 5G unit, a wireless network unit, a Bluetooth unit or the like. In an example, the rodent trap 1 comprises a sim card holder for communication with the cellular unit. In some examples the wireless transmitter and/or receiver 50, 50', may be embedded in the base 10 and may communicate with external antennas 50, 50'. In some examples the transmitter and/or receiver 50, 50', may be embedded with the antennas 50, 50'. In some examples one antenna 50 may be utilized for the wireless communication. Alternatively, a plurality of antennas 50, 50', may be utilized, depending on reception needs.

Figure 6:
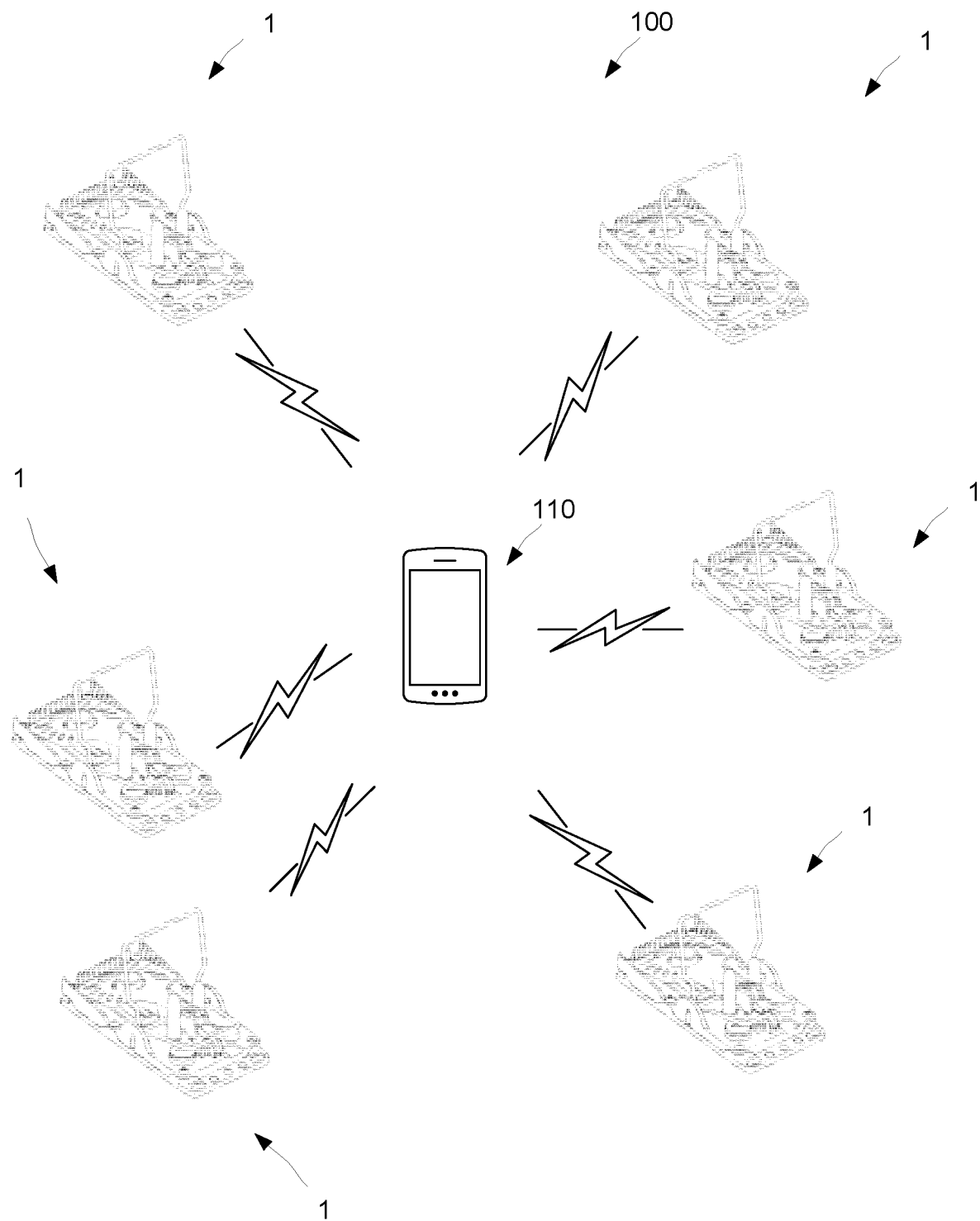
FIG. 6 is a schematic view of a rodent trap system comprising rodent traps and at least one receiver, according to one example.

The wireless transmitter 50 may be configured to transmit any of the at least three different distances ($A_1$, $A_2$, $A_3$) to a receiver 110, such as a remote receiver 110, as schematically illustrated in FIG. 6. Alternatively, or in addition, the wireless transmitter 50 is may be configured to transmit any of a ready state, a sprung empty state and a caught state of the rodent trap 1 associated with the at least three different distances ($A_1$, $A_2$, $A_3$), as described above, to a remote receiver 110.

Hence, the wireless transmitter 50 allows for communicating the detected state, i.e. the armed ready state, the caught state, or the false-positive/sprung empty state, and/or the distances ($A_1$, $A_2$, $A_3$), to a receiver 110. The receiver 110 can e.g. be a mobile phone, a computer, lap-top, a tablet, a webserver or the like that is configured to receive the detected state and/or distance ($A_1$, $A_2$, $A_3$). This communication can be performed by sending and/or receiving a signal and/or data that comprises the detected state and/or distance ($A_1$, $A_2$, $A_3$).

Figure 5A:
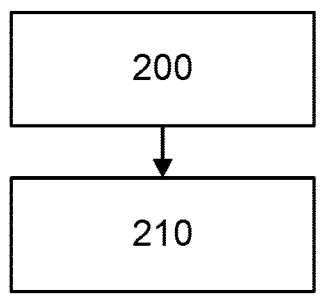
FIG. 5A is a flow chart of a method for determining a ready state, a sprung empty state and a caught state of a rodent trap, according to one example.

FIG. 5A is a flow chart of a method 200 for determining a ready state, a sprung empty state and a caught state of a rodent trap 1. The rodent trap 1 comprises a base 10, a kill bar 11 and a trigger member 12 arranged between the base 10 and the kill bar 11 such that when the trigger member 12 is activated the kill bar 11 is released and traps or kills the rodent. The method 200 comprises detecting 210 at least three different distances ($A_1$, $A_2$, $A_3$) between the trigger member 12 and the base 10. The method 200 thus provides for the advantageous benefits as described for the rodent trap 1 in relation to FIGS. 1-4 above. The method 200 provides for a robust and reliable detection of different states of the rodent trap 1.

Figure 5B:
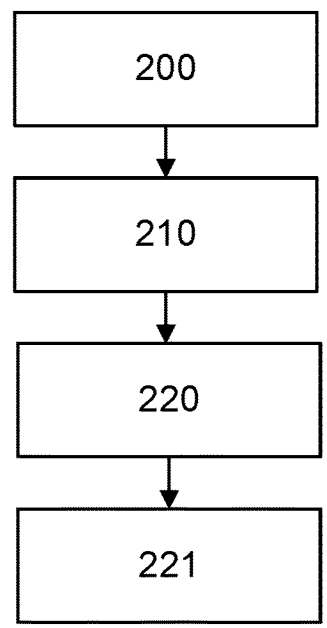
FIGS. 5B-E are further flow charts of a method for determining a ready state, a sprung empty state and a caught state of a rodent trap, according to examples of the disclosure.

FIGS. 5B-E are further flow charts of a method 200 for determining a ready state, a sprung empty state and a caught state of a rodent trap 1. The method 200 may comprise detecting 220 a first position ($p_1$) of the trigger member 12 when the kill bar 11 is in an armed position in the ready state of the rodent trap 1. The method 200 may comprise relating 221 a first trigger distance ($A_1$) of the at least three different distances ($A_1$, $A_2$, $A_3$) to said first position ($p_1$) and the ready state of the rodent trap 1 (FIG. 5B).

Figure 5C:
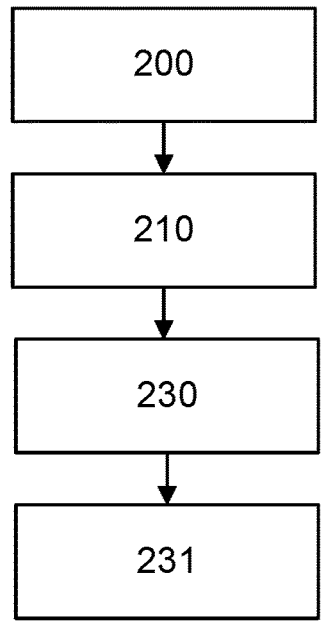

The method 200 may comprise detecting 230 a second position ($p_2$) of the trigger member 12 when the kill bar is in an unloaded position and in abutment with the base 10 corresponding to the sprung empty state of the rodent trap 1. The method 200 may comprise relating 231 a third trigger distance ($A_3$) of the at least three different distances ($A_1$, $A_2$, $A_3$) to said second position ($p_2$) and the sprung empty state of the rodent trap 1 (FIG. 5C).

Figure 5D:
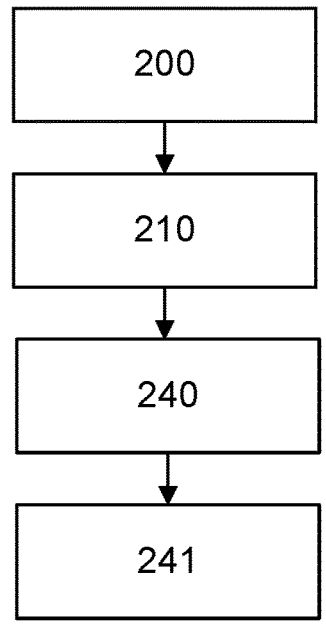
Figure 5E:
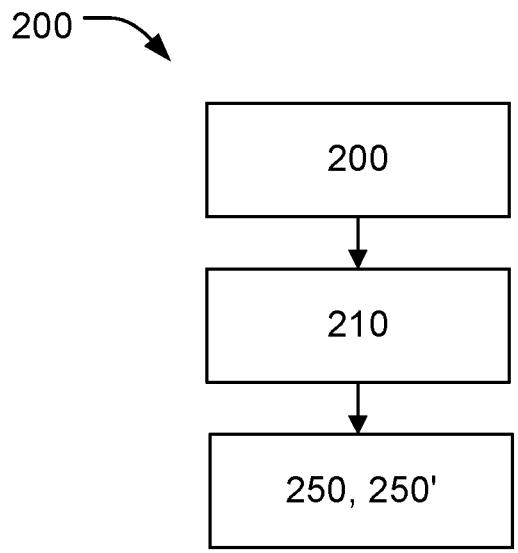

The method 200 may comprise detecting 240 a third position ($p_3$) of the trigger member 12, whereupon the trigger member 12 is movable relative the kill bar 11 in a direction towards the base 10 from the second position ($p_2$) to said third position ($p_3$) while the kill bar 11 is in said unloaded position. A gap (d) arranged in between the second and third positions ($p_2$, $p_3$) of the trigger member 12 may accommodate part of a rodent when trapped in the rodent trap 1, in the caught state thereof. The method 200 may comprise relating 241 a second trigger distance ($A_2$) of the at least three different distances ($A_1$, $A_2$, $A_3$) to said third position and the caught state of the rodent trap 1 (FIG. 5D).

The method 200 may comprise transmitting 250 any of the at least three different distances ($A_1$, $A_2$, $A_3$) to a receiver 110, and/or transmitting 250' any of the ready state, the sprung empty state and the caught state of the rodent trap 1 associated with the at least three different distances ($A_1$, $A_2$, $A_3$) to a receiver 110.

Figure 5F:
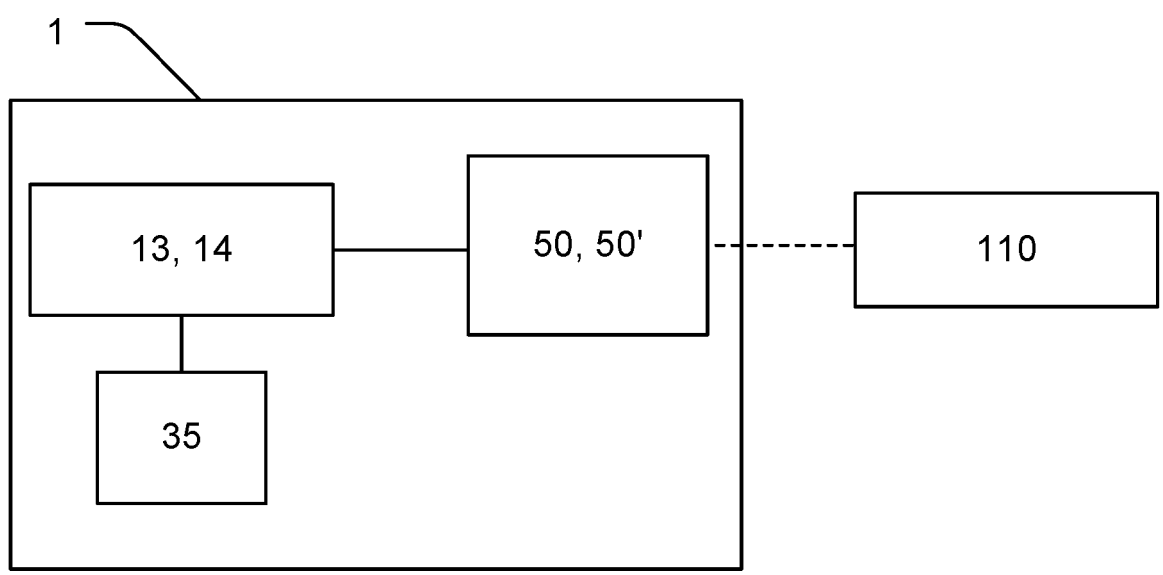
FIG. 5F is a schematic illustration, in a schematic view of an electronic communication between a sensor, a transmitter of a rodent trap, and a remote receiver, according to one example.

Illustrated in FIG. 5F is an example wherein the remote receiver 110 may be in direct communication with the wireless receiver and/or transmitter 50, 50', which in turn is in communication with the sensor 13, 14. In other examples the remote receiver 110, such as a mobile phone or computer, may communicate with the wireless receiver and/or transmitter 50, 50' of the rodent trap 1 via different types of relays such as a cellular tower, one or more webserver, apps, WIFI-protocols and so on.

In an example of the communication of the detected distances ($A_1$, $A_2$, $A_3$) between the rodent trap 1 and the remote receiver 110, the magnetic sensor 13, 14, first detects e.g. distance $A_3$. The distance $A_3$ is then communicated to the wireless transmitter 50, and then further to a cellular tower which relays the communication further to the remote receiver 110, such as a mobile phone 110. The mobile phone 110 can be programmed to show an alert that displays a given name of the rodent trap 1, a location of the rodent trap 1 and the detected distance $A_3$, and/or the state related to $A_3$, i.e. the false-positive/sprung empty state of the rodent trap 1.

In some examples, other parameters related to the rodent trap 1 can also be comprised in the communication to the remote receiver 110, such as temperature, humidity, sound alerts, or settings of the rodent trap 1 related to e.g. firmware, light commands for controlling connected light sources, error codes and so on. In some examples, the communication is only one way, i.e. the receiver 110 only receives communication. In other examples, the communication is a two-way communication where the remote receiver 110 can send communication to a wireless receiver 50' of the rodent trap 1.

The rodent trap 1 may comprise a notification unit 35 configured to emit an audible alert, and/or a visual alert to a user. A notification unit 35 is schematically indicated in the illustration of FIG. 2. The audible and/or visual alert may be associated with any one of the ready state, the sprung empty state, and the caught state of the rodent trap 1. The notification unit 35 may thus be in communication with the sensor 13, 14, as schematically illustrated in FIG. 5F. Each of the aforementioned states may be associated with a different audible and/or visual notification signal which notifies the user of the different states.

In an example illustrated in FIG. 6, a plurality of rodent traps 1 are combined into a rodent trap system 100. The rodent trap system 100 comprises at least one remote receiver 110. The rodent trap 1 comprises a wireless transmitter 50 in communication with the sensor 13, 14, and which is configured to transmit any of the at least three different distances ($A_1$, $A_2$, $A_3$) to the at least one remote receiver 110. Alternatively, or in addition, the wireless transmitter 50 is configured to transmit any of a ready state, a sprung empty state and a caught state of the rodent trap 1 associated with the at least three different distances ($A_1$, $A_2$, $A_3$) to at least one receiver 110. By having the rodent trap 1 and/or the system 100 configured to send and/or receive the detected state and/or distance ($A_1$, $A_2$, $A_3$) from at least one rodent trap 1 it is possible to minimize any time spent on checking the rodent traps 1 if they are triggered. It allows also for sending out the best fitted person for the job depending on the detected state of the rodent trap 1. For example, if the detected state of the rodent trap 1 is the false-positive/sprung empty state any one close to the rodent trap 1 may arm the rodent trap 1 again. If the detected state is the caught state, then a pest controller could be sent to the rodent trap 1.

Figure 7:
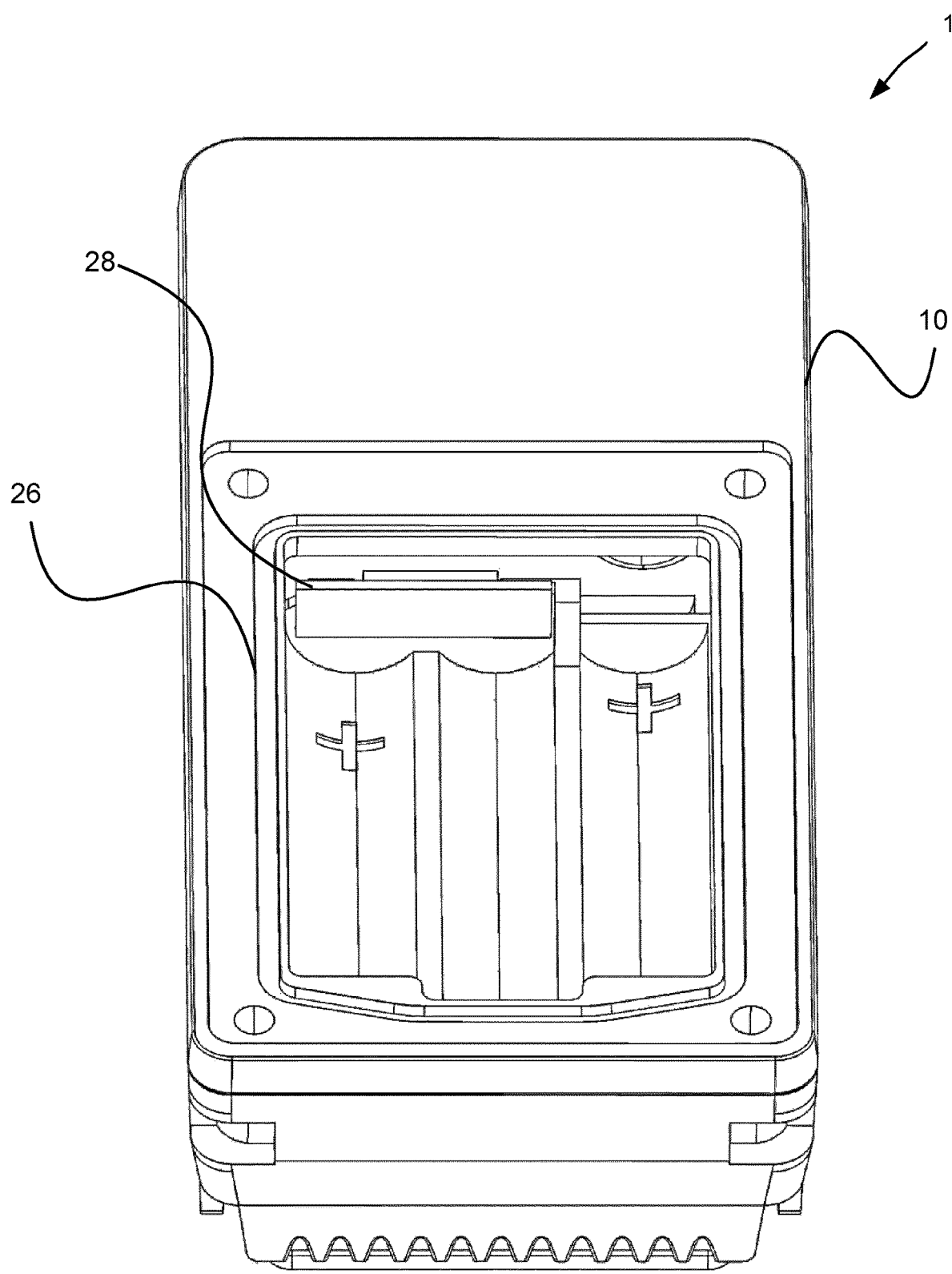
FIG. 7 is a schematic illustration, in a bottom view of a battery compartment of a rodent trap comprising a removable contact of the rodent trap, according to one example.

The rodent trap 1 may comprise a battery compartment 26, as schematically illustrated in e.g. FIG. 7, which may hold batteries for powering e.g. the sensor 13, 14, and/or the wireless transmitter and/or receiver 50, 50'. The battery compartment 26 may be accessible from underneath the rodent trap 1, or in other examples from above the rodent trap 1. In other examples the sensor 13, 14, and/or the wireless transmitter and/or receiver 50, 50', may have their own built-in battery. In the illustrated example of FIG. 4, a connection port 27 is also illustrated which may allow for communication with internal components such as a PCB (printed circuit board), the sensor 13, 14, and/or the wireless transmitter and/or receiver 50, 50', of the rodent trap 1. The connection port 27 may also allow for charging the batteries, either in the battery compartment 26 or built in batteries. In some examples, the connection port 27 may allow for externally powering rodent trap 1, if there are no batteries in the rodent trap 1. The connection port 27, as well as the rodent trap 1 as a whole may be classified according to IP class 67 or any other suitable IP class that allows for the rodent trap 1 to be placed in e.g. humid, wet and dusty conditions.

Illustrated in FIG. 7 is a bottom view of the rodent trap 1 and an example of the battery compartment 26 of the rodent trap 1. In this example three batteries fit in the battery compartment 26. The number and type of batteries may be different depending on e.g. the power requirement of the sensor 13, 14, and/or the wireless transmitter and/or receiver 50, 50'. The batteries may be based on lithium, alkaline or other types of battery technologies.

The rodent trap 1 may comprise a removable battery contact 28, illustrated in the example of FIG. 7, which may be in electric connection with electrical components of the rodent trap 1, such as the sensor 13, 14, and/or the wireless transmitter and/or receiver 50, 50'. By having a removable battery contact 28, it is possible to make the rodent trap 1 more compact since components that requires only temporary access can be hidden behind the removable battery contact 28 and do not need a designated open access to the outside on the rodent trap 1.

Figure 8:
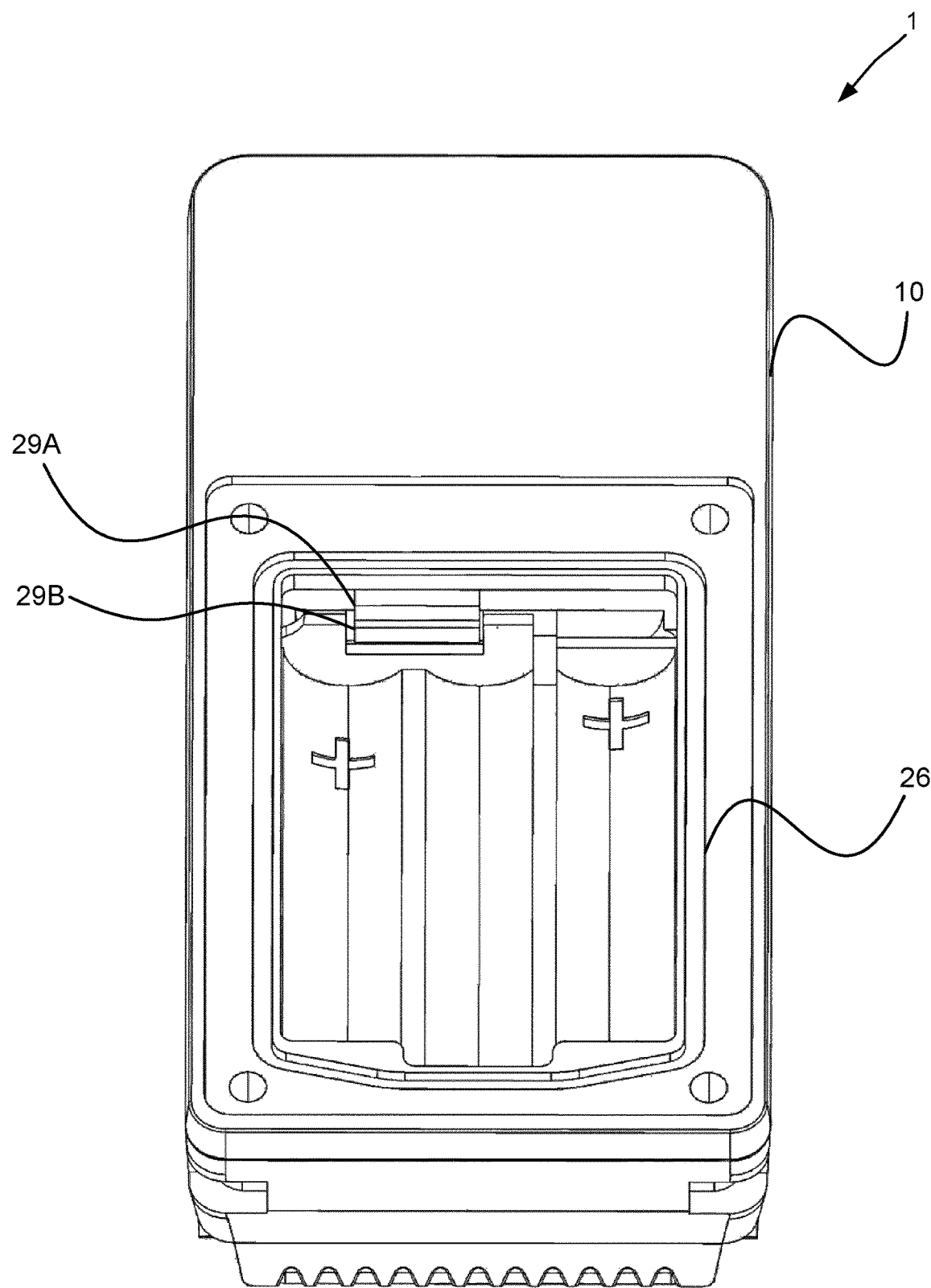
FIG. 8 is a schematic illustration, in a bottom view of a battery compartment of a rodent trap comprising additional connectors behind a removable contact, according to one example.

Illustrated in FIG. 8 is a bottom view of the rodent trap 1 and an example of two components having connectors 29A and 29B facing out into the battery compartment 26. Such components could be a USB (Universal Serial Bus) connector, a SIM (Subscriber identity module) card holder, a power charger connector and/or a PCB connector.

From the description above follows that, although various examples of the invention have been described and shown, the invention is not restricted thereto, but may also be embodied in other ways within the scope of the subject-matter defined in the following claims.

The invention claimed is:

1. A rodent trap comprising:
   a base,
   a kill bar, wherein the kill bar is pivotably connected to the base,
   a trigger member, wherein the trigger member is pivotably connected to the base and arranged between the base and the kill bar such that, when the trigger member is activated, the kill bar is released and traps or kills a rodent, and
   a sensor configured to detect at least three different distances between the trigger member and the base: a first distance associated with a ready state of the rodent trap, a second distance associated with a sprung empty state of the rodent trap, and a third distance associated with a caught state of the rodent trap, and
   further comprising a wireless transmitter in communication with the sensor and configured to transmit to a receiver the ready state, the sprung empty state, or the caught state of the rodent trap associated with said first distance, said second distance, or said third distance.

2. The rodent trap according to claim 1, wherein the trigger member is configured to assume:
   a first position when the kill bar is in an armed position in the ready state of the rodent trap,
   a second position when the kill bar is in an unloaded position and in abutment with the base corresponding to the sprung empty state of the rodent trap,
   wherein the trigger member is movable relative the kill bar in a direction towards the base from the second position to a third position while the kill bar is in said unloaded position, whereby a gap arranged in between the second and third positions of the trigger member accommodates part of the rodent when trapped in the rodent trap, in the caught state thereof.

3. The rodent trap according to claim 2, wherein the trigger member is resiliently movable from the second position to the third position upon application of a force on the trigger member towards the base, whereby the trigger member is biased to move from the third position to the second position when the force is removed.

4. The rodent trap according to claim 2, wherein the kill bar moves the trigger member from the first position to the second position when the kill bar moves from the armed position to the unloaded position.

5. The rodent trap according to claim 2, wherein the sensor is configured to relate the first distance of the at least three different distances to said first position and the ready state of the rodent trap.

6. The rodent trap according to claim 2, wherein the sensor is configured to relate the second distance of the at least three different distances to said third position and the caught state of the rodent trap.

7. The rodent trap according to claim 2, wherein the sensor is configured to relate the third distance of the at least three different distances to said second position and the sprung empty state of the rodent trap.

8. The rodent trap according claim 1, wherein the sensor comprises a magnetic sensor.

9. The rodent trap according to claim 8, wherein the magnetic sensor comprises a Hall effect sensor or a reed switch.

10. The rodent trap according to claim 1, wherein said sensor comprises a first sensor component arranged on the base and a second sensor component arranged on the trigger member and wherein said sensor detects a distance between the first and second sensor components.

11. A rodent trap comprising:
   a base,
   a kill bar, wherein the kill bar is pivotably connected to the base,
   a trigger member, wherein the trigger member is pivotably connected to the base and arranged between the base and the kill bar such that, when the trigger member is activated, the kill bar is released and traps or kills a rodent, and
   a sensor configured to detect at least three different distances between the trigger member and the base,
   wherein the sensor comprises a magnetic sensor and
   wherein the magnetic sensor comprises a magnet and a magnetic sensor unit, wherein the trigger member comprises the magnet, and the base comprises the magnetic sensor unit, wherein the magnetic sensor is configured to detect at least three different separations between the magnet and the magnetic sensor unit corresponding to said at least three different distances.

12. The rodent trap according to claim 11, wherein the trigger member comprises an extension, wherein the extension comprises the magnet.

13. A method for determining a ready state, a sprung empty state and a caught state of a rodent trap comprising a base, a kill bar pivotably connected to the base and a trigger member pivotably connected to the base and arranged between the base and the kill bar such that when the trigger member is activated the kill bar is released and traps or kills a rodent, the method comprising:
   detecting at least three different distances between the trigger member and the base using a sensor: a first distance associated with the ready state of the rodent trap, a second distance associated with the sprung empty state of the rodent trap, and a third distance associated with the caught state of the rodent trap, and
   transmitting the ready state, the sprung empty state, or the caught state of the rodent trap associated with said first distance, said second distance, or said third distance to a receiver.

14. The method according to claim 13, comprising
   detecting a first position of the trigger member when the kill bar is in an armed position in the ready state of the rodent trap, and
   relating the first distance of the at least three different distances to said first position and the ready state of the rodent trap.

15. The method according to claim 13, comprising:
   detecting a second position of the trigger member when the kill bar is in an unloaded position and in abutment with the base corresponding to the sprung empty state of the rodent trap, and
   relating the third trigger distance of the at least three different distances to said second position and the sprung empty state of the rodent trap.

16. The method according to claim 15, comprising:
   detecting a third position of the trigger member, whereupon the trigger member is movable relative the kill bar in a direction towards the base from the second position to said third position while the kill bar is in said unloaded position,
   whereby a gap arranged in between the second and third positions of the trigger member accommodates part of the rodent when trapped in the rodent trap, in the caught state thereof, and
   relating the second distance of the at least three different distances to said third position and the caught state of the rodent trap.

* * * * *